(12) United States Patent
Sato

(10) Patent No.: US 10,629,331 B2
(45) Date of Patent: Apr. 21, 2020

(54) POWER SUPPLY CABLE AND POWER SUPPLY CABLE WITH CONNECTOR

(71) Applicant: FUJIKURA LTD., Tokyo (JP)

(72) Inventor: Nozomi Sato, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/463,304

(22) PCT Filed: Jan. 18, 2018

(86) PCT No.: PCT/JP2018/001385
§ 371 (c)(1),
(2) Date: May 22, 2019

(87) PCT Pub. No.: WO2018/139335
PCT Pub. Date: Aug. 2, 2018

(65) Prior Publication Data
US 2019/0295743 A1 Sep. 26, 2019

(30) Foreign Application Priority Data

Jan. 27, 2017 (JP) .................. 2017-013004

(51) Int. Cl.
*H01B 7/00* (2006.01)
*H01B 7/18* (2006.01)
(Continued)

(52) U.S. Cl.
CPC ............... *H01B 7/425* (2013.01); *H01B 7/00* (2013.01); *H01B 7/18* (2013.01); *H01B 7/42* (2013.01);
(Continued)

(58) Field of Classification Search
CPC .......... H01B 7/425; H01B 7/18; H01B 9/003; B60L 53/18
(Continued)

(56) References Cited

U.S. PATENT DOCUMENTS 306,037 A * 9/1884 Turner ................... H01B 7/046
174/102 R
1,866,611 A * 7/1932 Affel .................. H01B 11/1882
174/14 R
(Continued)

FOREIGN PATENT DOCUMENTS

CN 202145390 U 2/2012
CN 202487259 U 10/2012
(Continued)

OTHER PUBLICATIONS

Fujikura Ltd., "Cable lead-mounted charging connector for high speed charger"; Online URL: <www.fujikura.co.jp/resource/pdf/td16001_2.pdf>; Nov. 2014; Search Date Jan. 30, 2018 (1 page).
(Continued)

*Primary Examiner* — Andargie M Aychillhum
*Assistant Examiner* — Michael F McAllister
(74) *Attorney, Agent, or Firm* — Osha Liang LLP

(57) ABSTRACT

A power supply cable includes: a first communication cord that includes a first signal line and a cover that accommodates the first signal line; a plurality of power lines each including a cooling tube, a conductor that surrounds the cooling tube, and an insulator that surrounds the conductor; and a sheath that accommodates the first communication cord and the plurality of power lines. In a cross-sectional view, the plurality of power lines surround the first communication cord.

9 Claims, 1 Drawing Sheet

(51) Int. Cl.
*H01B 7/42* (2006.01)
*H01R 13/46* (2006.01)
*B60L 53/18* (2019.01)
*H01B 9/00* (2006.01)

(52) U.S. Cl.
CPC ............ *H01B 9/003* (2013.01); *H01R 13/46* (2013.01); *B60L 53/18* (2019.02)

(58) Field of Classification Search
USPC ...................................................... 174/15.6
See application file for complete search history.

(56) References Cited

U.S. PATENT DOCUMENTS

| | | | | |
|---|---|---|---|---|
| 4,536,610 A | * | 8/1985 | Giussani | H01B 9/0611 174/15.6 |
| 6,350,947 B1 | * | 2/2002 | Bertini | H01B 7/2813 174/47 |
| 6,355,879 B1 | * | 3/2002 | Bertini | H01B 7/2813 174/47 |
| 7,772,495 B2 | * | 8/2010 | Wu | H01B 7/425 174/113 C |
| 8,575,489 B2 | * | 11/2013 | Oka | H01B 7/423 174/113 R |
| 2001/0002773 A1 | * | 6/2001 | Hyogo | H01B 9/003 307/147 |
| 2009/0178825 A1 | * | 7/2009 | Wu | H01B 7/425 174/113 R |
| 2012/0043935 A1 | * | 2/2012 | Dyer | B60L 1/003 320/109 |
| 2012/0199390 A1 | | 8/2012 | Oka et al. | |
| 2017/0144558 A1 | * | 5/2017 | Remisch | B60L 11/1818 |
| 2017/0338006 A1 | * | 11/2017 | Gontarz | B60L 53/14 |

FOREIGN PATENT DOCUMENTS

| | | |
|---|---|---|
| CN | 103339691 A | 10/2013 |
| DE | 102011100389 A1 | 5/2012 |
| JP | S53097384 U | 8/1978 |
| JP | 2001160322 A | 6/2001 |
| JP | 2009170426 A | 7/2009 |
| JP | 2012164478 A | 8/2012 |
| WO | 2016151752 A1 | 9/2016 |

OTHER PUBLICATIONS

Office Action issued in corresponding application No. JP2017013004 dated May 16, 2017 (2 pages).
Notice of Allowance issued in corresponding application No. JP2017013004 dated Aug. 1, 2017 (3 pages).

* cited by examiner ic # POWER SUPPLY CABLE AND POWER SUPPLY CABLE WITH CONNECTOR Priority is claimed from Japanese Patent Application No. 2017-013004, filed on Jan. 27, 2017, the content of which is incorporated herein by reference.

TECHNICAL FIELD

The present invention relates to a power supply cable and a power supply cable with a connector.

BACKGROUND

In the related art, a power supply cable as disclosed in Patent Document 1 has been known. The power supply cable includes a plurality of power lines, and a sheath covering the power lines. Each power line includes a tubular conductor which is a flow path of a refrigerant, and an insulator surrounding the conductor. In this configuration, since the conductor is cooled from the inside, it is possible to suppress an increase in the temperature of the conductor due to energization.

PATENT DOCUMENTS

[Patent Document 1] Japanese Unexamined Utility Model Application, First Publication No. S53-97384

In this type of power supply cable, a signal line used for communication with a power supply target or the like may be accommodated in the sheath together with the power lines. In such a case, the positions of the signal line and the power line in the sheath may change during use over a long period of time, and the durability against the bending of the power supply cable may be degraded.

SUMMARY

One or more embodiments of the present invention provide a power supply cable and a power supply cable with a connector, in which positions of a signal line and a power line in a sheath are hardly changed and durability against bending is maintained.

A power supply cable according to one or more embodiments of the present invention includes a first communication cord having a first signal line and a cover accommodating therein the first signal line; a plurality of power lines each having a cooling tube, a conductor surrounding the cooling tube, and an insulator surrounding the conductor; and a sheath accommodating therein the first communication cord and the plurality of power lines, in which In the cross-sectional view, the plurality of power lines are disposed so as to surround the first communication cord.

According to the power supply cable of one or more embodiments, since each power line has the cooling tube and the conductor surrounding the cooling tube, the conductor in the power line is cooled by the cooling tube from the inside thereof. Thus, since the inside of the power line as the heat source is evenly cooled, occurrence of uneven temperature in the power supply cable and the sheath surface can be suppressed, and the conductor can be efficiently cooled.

Further, in the power supply cable, the plurality of power lines are disposed so as to surround the first communication cord, and the first communication cord has a cover accommodating the first signal lines therein. With this configuration, the thickness of the cover of the first communication cord can be appropriately adjusted. Then, by changing the outer diameter of the first communication cord, it is possible to easily adjust the radial position of each power line surrounding the first communication cord in the sheath. Thereby, for example, each power line is in contact with the first communication cord in the radial direction and is in contact with another power line adjacent in the circumferential direction, so the position of each member in the sheath is hardly changed and durability against bending of the power supply cable can be maintained.

Here, the first communication cord may include a plurality of the first signal lines, and the plurality of first signal lines may be accommodated in the cover in a state of being wound integrally with the tape.

In this case, since the plurality of first signal lines are integrally wound with the tape, for example, when extruding the cover, it is possible to prevent the softened material to be the cover from entering between the first signal lines. Thus, it is possible to easily stabilize the thickness of the cover and the outer diameter of the first communication cord, thereby the above-described effect could be more reliably achieved.

Further, in the power supply cable, a second communication cord having a second signal line and the plurality of power lines may be disposed so as to surround the first communication cord in the cross-sectional view.

In this case, the number of provided communication means in the power supply cable can be increased due to the second communication cords. Further, since the second communication cord and each power line are disposed so as to surround the first communication cord, as described above, the position of each member in the sheath is hardly changed and durability against bending of the power supply cable is maintained.

In addition, in the power supply cable, the number of second communication cords may be two, and the number of the plurality of power lines may be four, and the first communication cord, the two second communication cords, and the four power lines may have substantially the same outer diameters.

In this case, a total of six second communication cords and power lines are disposed so as to surround the first communication cord having substantially the same outer diameter. With this configuration, while the second communication cord and the power line adjacent to each other are in contact with each other in the circumferential direction, the second communication cord and the power line are in contact with the first communication cord in the radial direction. Thus, the positions of the first communication cord, the second communication cord, and the power line in the sheath are more stabilized, and these members can be disposed at a high density in the sheath.

Further, for example, the position and attitude of each member are stabilized in a state where the power line and the second communication cord are wound around the first communication cord. This makes it difficult for the state to collapse, and it is also possible to simplify and stabilize the manufacturing process when these members are accommodated in the sheath.

In addition, the power supply cable may include a second communication cord having a plurality of second signal lines, the first communication cord has a plurality of the first signal lines, and the number of the first signal lines of the first communication cord may be smaller than the number of the second signal lines of the second communication cord.

In this case, since the number of the first signal lines included in the first communication cord is small, the adjustment range of the thickness of the cover accommodating the first signal lines therein can be increased. This makes it possible to more easily stabilize the position of each member in the sheath, with the first communication cord as the desired outer diameter, as described above.

Further, the plurality of first signal lines may be accommodated in the cover in a twisted state, and may be used for communication with a power supply target.

In this case, since a small number of first signal lines are twisted to each other, the adjustment range of the pitch for twisting the first signal lines can be increased. This makes it possible to easily select an optimum twist pitch such that the influence of noise acting on the first signal line is reduced. Further, by using the first signal line for communication with the power supply target, it is possible to provide a power supply cable ensuring reliability of communication with the power supply target.

Further, a power supply cable with a connector according to one or more embodiments of the present invention includes the power supply cable, and a connector configured to be connected to a power supply target.

According to the power supply cable with a connector described above, it is possible to stably dispose each member in the sheath while suppressing the occurrence of unevenness in temperature on the surface of the sheath at the time of power supplying.

According to one or more embodiments of the present invention, it is possible to provide a power supply cable and a power supply cable with a connector, in which positions of a signal line and a power line in a sheath are hardly changed and durability against bending is maintained.

DETAILED DESCRIPTION

Hereinafter, the configuration of a power supply cable according to one or more embodiments of the present invention will be described with reference to FIG. 1.

Figure 1:
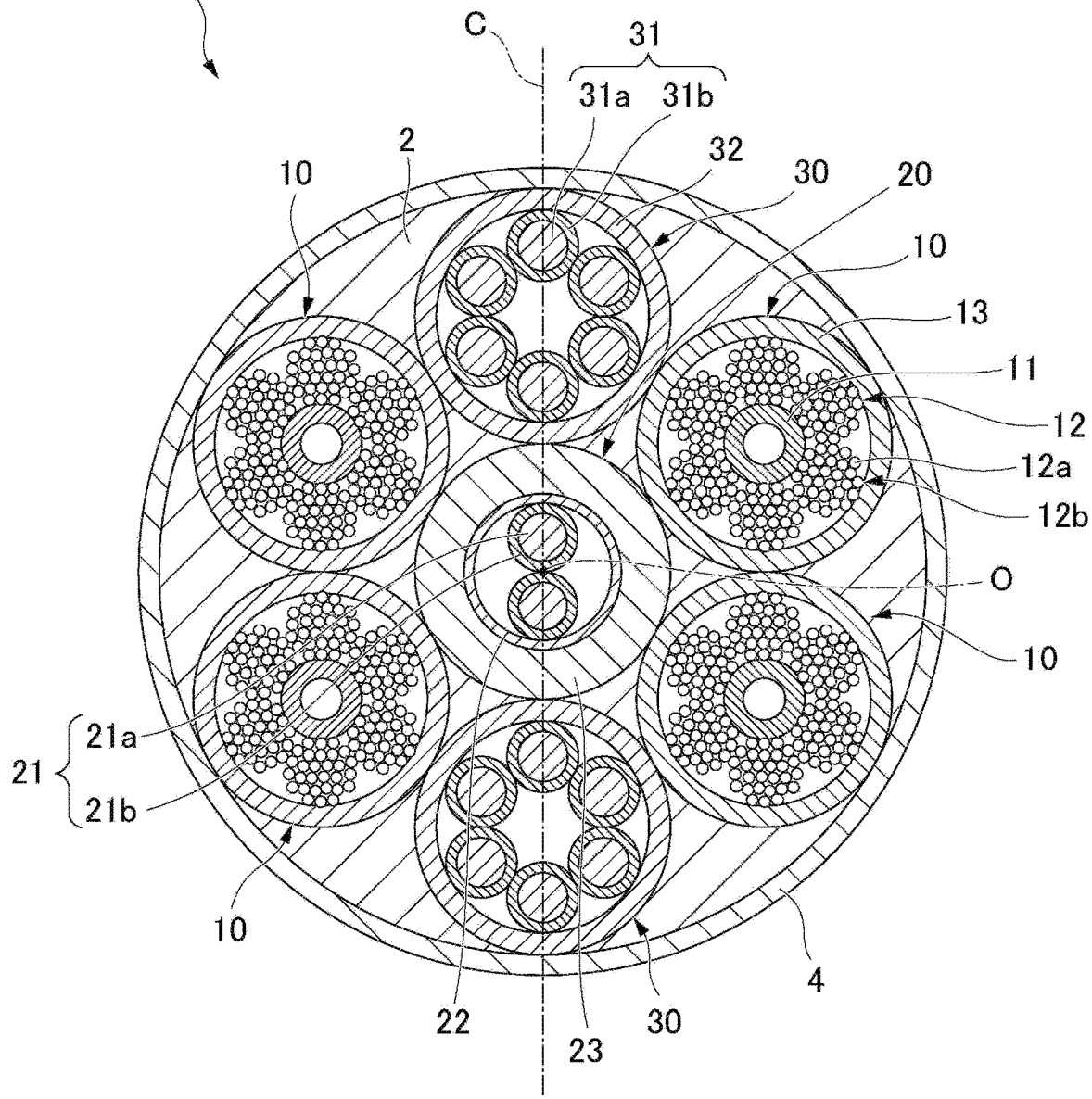
FIG. 1 is a cross-sectional view showing a configuration of a power supply cable according to one or more embodiments.

As shown in FIG. 1, a power supply cable 1 includes a plurality of power lines 10, a first communication cord 20, a plurality of second communication cords 30, a filling 2, and a sheath 4. In one or more embodiments, the power supply cable 1 includes four power lines 10 and two second communication cords 30. Even number of power lines 10 and second communication cords 30 are provided.

The power supply cable 1 is used, for example, when electrically connecting the charger and the power supply target object and supplying power to the power supply target. The power supply target may be an electric vehicle (vehicle) or the like.

In the case of quickly charging the battery for an electric vehicle using the power supply cable 1, for example, a large current of 250 A or more flows through the power line 10. Even in such a state that a large current is flowing, there is a possibility that the user directly touches the power supply cable 1, therefore it is necessary to keep the temperature of the surface of the sheath 4 within a predetermined range.

Further, the power supply cable 1 may be accommodated by being partially wound when not in use. When used, the power supply cable 1 is pulled out from the partially wound accommodated state. That is, winding and pulling out of the power supply cable 1 may be repeated. Therefore, durability against friction, durability against bending, flexibility, and the like are required for the entire power supply cable 1.

(Direction Definition)

Here, in one or more embodiments, a direction along the central axis O of the power supply cable 1 is referred to as a longitudinal direction. Further, in the cross-sectional view orthogonal to the central axis O, a direction orthogonal to the central axis O is referred to as a radial direction, and a direction revolving around the central axis O is referred to as a circumferential direction.

(First Communication Cord)

The first communication cord 20 may be used for communication between, for example, a vehicle as a power supply target and a charger. In the cross-sectional view, the first communication cord 20 is disposed at the center of the power supply cable 1. In the cross-sectional view, the first communication cord 20 is surrounded by four power lines 10 and two second communication cords 30.

The first communication cord 20 includes a plurality (two) of first signal lines 21, a tape 22 that wraps around the first signal lines 21, and a cover 23 covering the tape 22. The number of the first signal lines 21 included in the first communication cord 20 is smaller than the number of the second signal lines 31 included in the second communication cord 30. For example, the number of first signal lines 21 is two and the number of second signal lines 31 is six.

The first communication cord 20 has flexibility. The first signal line 21 has a configuration in which the conductor 21a is covered with an insulator 21b. The plurality of first signal lines 21 are accommodated in the cover 23 in a state of being integrally wound with the tape 22.

In one or more embodiments, the two first signal lines 21 are accommodated in the cover 23 in a twisted state. One first communication cord 20 is a so-called twisted pair cable. Therefore, the adjustment range of the pitch for twisting the two first signal lines 21 can be increased, and an optimum pitch can be selected from the viewpoint of noise during communication.

The thickness of the cover 23 is larger than the thickness of the tape 22. The thickness of the cover 23 is larger than the thickness of the tape 32 to be described later of the second communication cord 30. By changing the thickness of the cover 23, it is possible to adjust the outer diameter of the first communication cord 20 and easily adjust the position of each second communication cord 30 and each power line 10 in the radial direction. Thus, each second communication cord 30 and each power line 10 are in contact with the cover 23 in the radial direction, and the second communication cord 30 and the power line 10, which are adjacent in the circumferential direction, or the power lines 10 can be brought into contact with each other in the circumferential direction. In this way, by properly adjusting the thickness of the cover 23, each second communication cord 30 and each power line 10 can be positioned around the first communication cord 20 in a well-balanced manner.

(Second Communication Cord)

The second communication cord 30 is disposed radially outward of the first communication cord 20. In the cross-sectional view shown in FIG. 1, two second communication cords 30 are disposed so as to sandwich the first communication cord 20 in the radial direction. The outer diameter of the second communication cord 30 is substantially the same as the outer diameters of the first communication cord 20 and the power line 10. The outer diameters of the two second communication cords 30 are substantially the same as each other.

The second communication cord 30 has flexibility. The second communication cord 30 includes six second signal lines 31, and a tape 32 that wraps around the second signal lines 31. Each second signal line 31 is used for controlling the locking mechanism of the connector 40 to be described later, the power source line of an LED that lights up at the time of power supply, and the signal line of the temperature sensor when the connector 40 is provided with a temperature sensor. In addition, part of the second signal line 31 may be used as an auxiliary power supply line to the power supply target.

Each second signal line 31 is wrapped with a tape 32 in a state of being spirally twisted. The second signal line 31 has a configuration in which the conductor 31a is covered with an insulator 31b. The outer diameter of the second signal line 31 of the second communication cord 30 may be substantially the same as the outer diameter of the first signal line 21 of the first communication cord. Alternatively, the outer diameter of the second signal line 31 may be different from the outer diameter of the first signal line 21.

(Power Line)

Each power line 10 has one cooling tube 11, a conductor 12, and an insulator 13. The power line 10 has flexibility.

The cooling tube 11 is disposed at the center of the power line 10. As the cooling tube 11, for example, a tube made of nylon 12 can be used. Since the nylon 12 is excellent in heat resistance and insulation properties, it is suitable as a material of the cooling tube 11 which is in contact with the conductor 12 which generates heat by energization. In addition, since the nylon 12 is also excellent in flexibility and mechanical strength, it is suitable as a material of the inside of the power supply cable 1 which is required to have flexibility and durability. In addition to nylon 12, as the material of the cooling tube 11, for example, other materials such as silicone resin, fluororesin, polyurethane, and polyolefin may be appropriately used.

Inside the cooling tube 11, refrigerant such as liquid refrigerant, air, water, oil, and antifreeze liquid is filled. The refrigerant in the cooling tube 11 flows by a circulation device (not shown). The cooling tube 11 of one or more embodiments has an outer diameter of 4.0 mm and an inner diameter of 2.5 mm. A low viscosity refrigerant is suitable for flowing inside the cooling tube 11 having a small inner diameter as described above. Further, since the power supply cable 1 may be used in cold climates, a refrigerant that is an antifreeze liquid is suitable. The dimensions of the cooling tube 11 and the properties of the refrigerant are not limited to those described above, and may be changed as appropriate.

The conductor 12 surrounds the cooling tube 11. For example, a direct current of 250 A or more flows through the conductor 12 in one or more embodiments. The conductor 12 is formed by winding a plurality of conductor wires 12b around the cooling tube 11. In one or more embodiments, the conductor wire 12b is formed by bundling and twisting 21 strands 12a. The conductor 12 is formed by collectively twisting ten conductor wires 12b around the cooling tube 11. Thus, the conductor 12 is evenly disposed around the cooling tube 11. For example, a tin plated soft copper wire can be used as each strand 12a constituting the conductor wire 12b.

The number of the conductor wires 12b and the strands 12a included in one conductor 12 can be appropriately changed. In addition, the number of conductor wires 12b and strands 12a shown in FIG. 1 is appropriately changed for simplification of the drawing.

The insulator 13 covers (surrounds) the conductor 12. As the material of the insulator 13, for example, EP rubber can be used.

Each power line 10 is disposed radially outward of the first communication cord 20. One power line 10 is sandwiched in the circumferential direction by the second communication cord 30 and another power line 10.

In the cross-sectional view shown in FIG. 1, four power lines 10 are disposed at line-symmetrical positions with respect to the symmetry axis C passing through the centers of the two second communication cords 30. Further, since the two second communication cords 30 are disposed at positions sandwiching the first communication cord 20 in the radial direction, the symmetry axis C passes through the center of the first communication cord 20. In this way, each power line 10, the first communication cord 20, and each second communication cord 30 are disposed such that the cross section of the power supply cable 1 is line-symmetrical with respect to the symmetry axis C. Further, in one or more embodiments, each power line 10, the first communication cord 20, and each second communication cord 30 are disposed such that the cross section of the power supply cable 1 is point-symmetrical with the center axis O as a center. Thus, it is possible to suppress occurrence of temperature unevenness in the power supply cable 1 at the time of energization, to prevent the surface of the sheath 4 from locally becoming high temperature, and to further enhance safety.

The outer diameter of the power line 10 is substantially the same as the outer diameters of the first communication cord 20 and the second communication cord 30. The outer diameters of the four power lines 10 are substantially the same as each other.

In the cross-sectional view, one of the cooling tubes 11 respectively included in the pair of power lines 10 adjacent to each other in the circumferential direction is an outward path of the refrigerant, and the other is a return path of the refrigerant. In addition, the directions of the currents flowing through the conductors 12 respectively included in the pair of power lines 10 adjacent to each other are the same.

The sheath 4 covers the power line 10, the first communication cord 20, and each second communication cord 30 integrally with the filling 2. Each power line 10 and each second communication cord 30 are accommodated in the sheath 4 together with the filling 2 in a state of being spirally wrapped around the first communication cord 20. The sheath 4 can be formed by extrusion molding or the like using, for example, chloroprene rubber or the like.

The filling 2 is filled around each power line 10, the first communication cord 20, and each second communication cord 30. The position of each member can be stabilized when the member is covered with the sheath 4, by the filling 2. Further, the filling 2 functions as a cushioning material for protecting the power line 10 and the communication cords 20, 30 from being damaged, for example, when the power supply cable 1 is stepped on the vehicle body or the like. As the fillings 2, for example, Tetoron threads or the like can be used.

(Connector)

Figure 2:
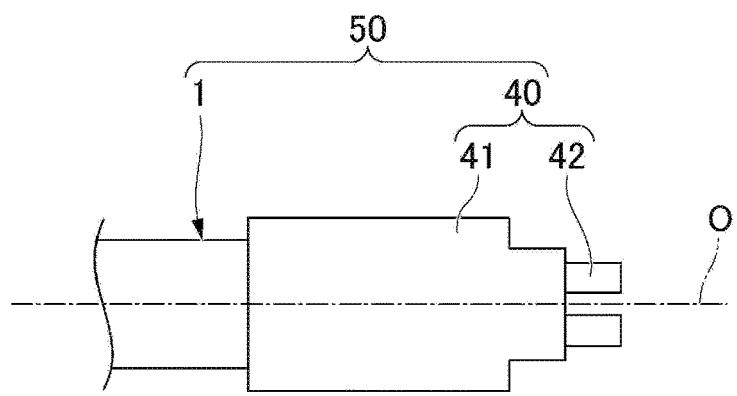
FIG. 2 is a schematic diagram of a power supply cable with a connector provided with the power supply cable of FIG. 1.

FIG. 2 is a schematic diagram of the power supply cable with a connector 50 provided with the power supply cable 1. As shown in FIG. 2, the power supply cable with a connector 50 includes a power supply cable 1, and a power supply connector (hereinafter simply referred to as a connector 40) disposed at a first end portion of the power supply cable 1.

The connector 40 is configured to be connected to the power supply target. The connector 40 includes a case 41 and a plurality of connector terminals 42.

The first end portion of the power supply cable 1 is accommodated in the case 41. Each of the conductors 12 in each power line 10 is electrically connected to each connector terminal 42. A pair of cooling tubes 11 adjacent to each other in the circumferential direction in the power line 10 are connected to each other by a connecting pipe (not shown) in the case 41. One of the pair of cooling tubes 11 is used as an outward path of the refrigerant, and the other is used as a return path of the refrigerant. Thus, the refrigerant flows in the order of the cooling tube 11 as the outward path, the connecting pipe, and the cooling tube 11 as the return path, and can cool both the power supply cable 1 and the connector 40. Since the power supply cable 1 of one or more embodiments includes four (two pairs of) power lines 10 and cooling tubes 11, two connecting pipes are accommodated in the case 41.

The second end portion of the power supply cable 1 is connected to a charger (not shown) having a refrigerant circulation device. The refrigerant in each cooling tube 11 is connected to the circulation device. Thus, the refrigerant circulates in the power supply cable 1 and the connector 40. In FIG. 2, the connecting portion between the power supply cable 1 and the above-described charger is not shown.

As described above, according to one or more embodiments, since each power line 10 has the cooling tube 11 and the conductor 12 surrounding the cooling tube 11, the conductor 12 in the power line 10 is cooled by the cooling tube 11 from the inside thereof. Thus, since the inside of the power line 10 which is the heat source is evenly cooled, temperature unevenness in the power supply cable 1 is suppressed. This makes it possible to restrain the power line 10, the first communication cord 20, the second communication cord 30, and the like accommodated in the power supply cable 1 from locally becoming high temperature, in addition to the surface of the sheath 4.

Further, since the power line 10, the first communication cord 20, and second communication cord 30 respectively have flexibility, the power supply cable 1 as a whole has flexibility. Thus, for example, the power supply cable 1 can be easily wound and accommodated in non-use or extended out in use, so the power supply cable 1 excellent in handleability can be obtained.

Further, in the power supply cable 1 of one or more embodiments, the plurality of power lines 10 are disposed so as to surround the first communication cord 20, and the first communication cord 20 has a cover 23 accommodating the plurality of first signal lines 21. With this configuration, by appropriately adjusting the thickness of the cover 23 of the first communication cord 20, the outer diameter of the first communication cord 20 can be changed. Thus, it is possible to easily adjust the radial position of each power line 10 surrounding the first communication cord 20 in the sheath 4. Thus, for example, each of the power lines 10 is in contact with the first communication cord 20 in the radial direction and is in contact with another power line 10 adjacent in the circumferential direction, which makes it difficult to change the position of each member in the sheath 4.

In addition, the plurality of first signal lines 21 are accommodated in the cover 23 in a state of being integrally wound with the tape 22. With this configuration, for example, when extruding the cover 23, it is possible to prevent the softened material forming the cover 23 from entering between the first signal lines 21. Thus, it is possible to easily stabilize the thickness of the cover 23 and the outer diameter of the first communication cord 20, thereby the above-described effect could be more reliably achieved.

In addition, the power supply cable 1 of one or more embodiments includes a plurality of second communication cords 30 having a plurality of second signal lines 31, and a large number of communication means are provided. Further, each second communication cord 30 and each power line 10 are disposed so as to surround the first communication cord 20. Therefore, as described above, the positions of the members 10, 20, 30 in the sheath 4 are hardly changed and durability against bending of the power supply cable 1 can be maintained.

Further, the power supply cable 1 of one or more embodiments includes two second communication cords 30 and four power lines 10, and the total of six second communication cords 30 and power line 10 are disposed so as to surround the first communication cord 20 having substantially the same outer diameter as those of them. With this configuration, as shown in FIG. 1, while the second communication cord 30 and the power line 10 adjacent to each other are in contact with each other in the circumferential direction, each second communication cord 30 and each power line 10 are in contact with the first communication cord 20 in the radial direction. Thus, the positions of the first communication cord 20, the second communication cord 30, and the power line 10 in the sheath 4 are hardly changed, and these members can be disposed at a high density in the sheath 4.

Further, the position and attitude of each member 10, 20, 30 are stabilized in a state where each power line 10 and each second communication cord 30 are wound around the first communication cord 20. This makes it difficult for the winding state to collapse, and it is also possible to simplify the manufacturing process and stabilize the quality when these members are accommodated in the sheath 4.

Since the number of the first signal lines 21 included in the first communication cord 20 is small, the adjustment range of the thickness of the cover 23 accommodating the first signal lines 21 therein can be increased. This makes it easier to stabilize the position of each member 10, 20, 30 in the sheath 4, with the first communication cord 20 as the desired outer diameter, as described above.

Further, since a small number of first signal lines 21 are twisted to each other, it is possible to increase the adjustment range of the pitch for twisting the first signal lines 21. This makes it possible to easily select an optimum twist pitch such that the influence of noise acting on the first signal line 21 is reduced. Further, by using the first signal line 21 for communication with the power supply target, it is possible to obtain a power supply cable 1 which is less susceptible to noise and ensures reliability of communication with the power supply target.

In addition, since a plurality of first signal lines 21 twisted together are disposed at the center of the power supply cable 1, even if the power supply cable 1 is bent, the tension acting on each first signal line 21 can be suppressed to be small.

Further, since the outer diameters of the plurality of power lines 10 are substantially the same as each other, it is possible to reduce the cost by using the respective power lines 10 in common. It is possible to make the temperature of the surface of each power line 10 uniform, thereby more reliably suppressing temperature unevenness inside and outside the power supply cable 1.

Further, since the power supply cable with a connector 50 includes the power supply cable 1, and the connector 40 configured to be connected to the power supply target, it is possible to stably dispose each member in the sheath 4 while suppressing the occurrence of unevenness in temperature on the surface of the sheath 4 at the time of power supplying.

It should be noted that the technical scope of the present invention is not limited to the above-described embodiments, and various modifications can be made without departing from the spirit of the present invention.

For example, in the above embodiments, the configuration including two second communication cords 30 and four power lines 10 has been described. However, the number of second communication cords 30 and the number of power lines 10 accommodated in the sheath 4 may be appropriately changed. Even in this case, the second communication cord 30 and the power line 10 are disposed so as to surround the first communication cord 20, so it is possible to obtain the above-described action and effect. For example, the two second communication cords 30 and the two power lines 10 may be disposed so as to surround the first communication cord 20. In this case, by setting the outer diameters of the second communication cord 30 and the power line 10 to be substantially equal, and making the outer diameters smaller than the outer diameter of the first communication cord 20, it is possible to bring respective members adjacent to each other in the radial direction or the circumferential direction into contact with each other.

In the above embodiments, the configuration of the second communication cord 30 is different from that of the first communication cord 20, but a second communication cord 30 having the same configuration as that of the first communication cord 20 may be adopted.

Further, in the above-described embodiments, one of the cooling tubes 11 respectively included in the pair of power lines 10 adjacent to each other is described as the outward path of the refrigerant, and the other is the return path of the refrigerant. However, the present invention is not limited thereto, each of the cooling tubes 11 respectively included in the pair of power lines 10 adjacent to each other may be a outward path or a return path of the refrigerant.

In the above embodiments, the directions of the currents flowing through the conductors 12 respectively included in the pair of power lines 10 adjacent to each other are the same. However, the present invention is not limited thereto, and the directions of the currents flowing through the conductors 12 respectively included in the pair of power lines 10 adjacent to each other may be different from each other.

In the above embodiments, the second communication cord 30 and the power line 10 are disposed so as to surround the first communication cord 20, but the present invention is not limited thereto, and only the power line 10 may be disposed so as to surround the first communication cord 20. In this case, the power supply cable 1 is provided with six power lines 10, and the six power lines 10 may be disposed so as to surround the second communication cord 30 in cross-sectional view.

Further, in FIG. 1, two power lines 10 and one second communication cord 30 are alternately disposed in the circumferential direction. With this configuration, the power line 10 and the second communication cord 30 are disposed in a well-balanced manner, it is possible to suppress occurrence of temperature unevenness in the power supply cable 1 at the time of energization, and to suppress the occurrence of a locally high temperature portion. This effect can be obtained by alternately disposing one or a plurality of power lines 10 and one second communication cord 30 in the circumferential direction.

Besides, without departing from the spirit of the present invention, it is possible to appropriately replace the constituent elements in the above-described embodiments with well-known constituent elements, and the above-described embodiments and modifications may be appropriately combined.

DESCRIPTION OF THE REFERENCE SYMBOLS

1 power supply cable
2 filling
4 sheath
10 power line
11 cooling tube
12 conductor
12*a* strand
12*b* conductor wire
13 insulator
20 first communication cord
21 first signal line
22 tape
23 cover
30 second communication cord
31 second signal line
32 tape
40 connector
50 power supply cable with a connector Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A power supply cable comprising:
a first communication cord comprising a first signal line and a cover that accommodates the first signal line;
a plurality of power lines each comprising a cooling tube, a conductor that surrounds the cooling tube, and an insulator that surrounds the conductor; and
a sheath that accommodates the first communication cord and the plurality of power lines, wherein
in a cross-sectional view, the plurality of power lines surround the first communication cord,
the first communication cord comprises a plurality of the first signal lines, and
the plurality of first signal lines are integrally wound with a tape and accommodated in the cover.

2. A power supply cable comprising:
a first communication cord comprising a first signal line and a cover that accommodates the first signal line;
a plurality of power lines each comprising a cooling tube, a conductor that surrounds the cooling tube, and an insulator that surrounds the conductor;
a sheath that accommodates the first communication cord and the plurality of power lines; and
one or more second communication cords, each comprising a second signal line, wherein
the plurality of power lines and at least one of the second communication cords surround the first communication cord in the cross-sectional view.

3. The power supply cable according to claim 2, wherein
the power supply cable has exactly two second communication cords,
the power supply cable has exactly four power lines, and the first communication cord, the two second communication cords, and the four power lines have substantially the same outer diameter.

4. A power supply cable comprising:
a first communication cord comprising a first signal line and a cover that accommodates the first signal line;
a plurality of power lines each comprising a cooling tube, a conductor that surrounds the cooling tube, and an insulator that surrounds the conductor;
a sheath that accommodates the first communication cord and the plurality of power lines; and
a second communication cord comprising a plurality of second signal lines, wherein
in a cross-sectional view, the plurality of power lines surround the first communication cord,
the first communication cord comprises a plurality of the first signal lines, and
the number of the first signal lines is smaller than the number of the second signal lines.

5. The power supply cable according to claim 4, wherein the plurality of first signal lines are accommodated in the cover in a twisted state and communicate with a power supply target.

6. A power supply cable with a connector, comprising:
the power supply cable according to claim 1; and
a connector that connects to a power supply target.

7. The power supply cable according to claim 2, further comprising:
a plurality of the second communication cords, wherein
the first communication cord, the plurality of second communication cords, and the plurality of power lines have the same outer diameter.

8. A power supply cable with a connector, comprising:
the power supply cable according to claim 2; and
a connector that connects to a power supply target.

9. A power supply cable with a connector, comprising:
the power supply cable according to claim 4; and
a connector that connects to a power supply target.

* * * * *